(12) United States Patent
Nishikawa

(10) Patent No.: US 10,012,559 B2
(45) Date of Patent: Jul. 3, 2018

(54) SENSOR DEVICE HAVING BODY, PRESSURE SENSOR, INSERT WITH HELICALLY SHAPED GROOVE AND TEMPERATURE SENSOR

(71) Applicant: TLV CO., LTD., Hyogo (JP)

(72) Inventor: Yoshihiro Nishikawa, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 0 days.

(21) Appl. No.: 15/473,301

(22) Filed: Mar. 29, 2017

(65) Prior Publication Data

US 2017/0205304 A1 Jul. 20, 2017

Related U.S. Application Data

(63) Continuation of application No. PCT/JP2015/077972, filed on Oct. 1, 2015.

(30) Foreign Application Priority Data

Oct. 3, 2014 (JP) .................................. 2014-204390

(51) Int. Cl.
*G01K 13/02* (2006.01)
*G01L 19/06* (2006.01)
(Continued)

(52) U.S. Cl.
CPC ............... *G01L 19/06* (2013.01); *G01K 13/02* (2013.01); *G01L 19/00* (2013.01); *G01L 19/14* (2013.01)

(58) Field of Classification Search
CPC ............................................. G01L 2019/0053
See application file for complete search history.

(56) References Cited

U.S. PATENT DOCUMENTS 1,619,444 A 3/1927 Taylor
3,691,840 A * 9/1972 Dufour ................ G01K 13/022
136/230
(Continued)

FOREIGN PATENT DOCUMENTS

JP S44-194 B1 1/1969
JP 2012-121070 A 6/2012
(Continued)

OTHER PUBLICATIONS

International Search Report issued in PCT/JP2015/077972; dated Dec. 22, 2015.

*Primary Examiner* — Harshad R Patel
*Assistant Examiner* — Tran M Tran
(74) *Attorney, Agent, or Firm* — Studebaker & Brackett PC

(57) ABSTRACT

Sensor device is provided with body, formed at the interior of which is gas passage into which steam serving as detection target flows; and pressure sensor, which is installed at body so as to be in communication with gas passage and which detects pressure of steam within gas passage. Body has rod-shaped portion having cylindrical inside circumferential surface. Sensor device is provided with sheath pipe (insert) that is formed in the shape of a rod on which helical groove is formed at outside circumferential surface, and that is such that, when inserted within rod-shaped portion of body, helical groove, together with inside circumferential surface of rod-shaped portion, form helically shaped gas passage (helical passage).

4 Claims, 7 Drawing Sheets

(51) Int. Cl.
*G01L 19/00* (2006.01)
*G01L 19/14* (2006.01)

(56) References Cited

U.S. PATENT DOCUMENTS

| | | | | |
|---|---|---|---|---|
| 3,744,307 A * | 7/1973 | Harper | ............ | E21B 47/06 73/152.51 |
| 4,028,943 A * | 6/1977 | Hyanova | ............ | G01K 1/045 374/143 |
| 4,106,525 A * | 8/1978 | Currie | ............ | F15C 4/00 138/42 |
| 4,176,683 A * | 12/1979 | Leibinsohn | ............ | A61M 5/16881 137/559 |
| 4,227,551 A * | 10/1980 | Hawkins | ............ | F15D 1/02 138/111 |
| 4,244,212 A * | 1/1981 | Stignani | ............ | G01F 1/40 73/112.01 |
| 4,299,253 A * | 11/1981 | Burton | ............ | E21B 47/18 138/26 |
| 4,349,281 A * | 9/1982 | Onksen | ............ | G01K 1/14 374/136 |
| 4,594,877 A * | 6/1986 | Kyker | ............ | G01L 19/0609 138/43 |
| 4,805,448 A * | 2/1989 | Armell | ............ | E21B 47/06 374/136 |
| 4,991,976 A * | 2/1991 | Byles | ............ | G01K 1/18 136/230 |
| 5,063,784 A * | 11/1991 | Ridenour | ............ | G01L 19/0007 73/431 |
| 5,228,334 A * | 7/1993 | Stone | ............ | G01L 9/0057 73/114.43 |
| 5,343,754 A * | 9/1994 | Stone | ............ | G01L 19/0609 138/42 |
| 5,495,748 A * | 3/1996 | Brede | ............ | G01L 19/12 73/40 |
| 5,503,013 A * | 4/1996 | Zeller | ............ | E21B 47/011 73/152.18 |
| 5,948,989 A * | 9/1999 | Ichikawa | ............ | G01L 19/0084 73/708 |
| 6,142,020 A * | 11/2000 | Kim | ............ | F02B 77/08 73/114.37 |
| 6,149,295 A * | 11/2000 | Volkmer | ............ | B01F 7/16 366/142 |
| 6,212,946 B1 * | 4/2001 | Naegele | ............ | G01D 11/245 374/E1.026 |
| 6,267,010 B1 * | 7/2001 | Hatanaka | ............ | G01D 11/245 374/E13.006 |
| 6,272,913 B1 * | 8/2001 | Naegele | ............ | G01K 13/02 374/E13.006 |
| 6,299,349 B1 * | 10/2001 | Steinel | ............ | B29C 45/77 374/143 |
| 6,564,656 B1 * | 5/2003 | Woolfenden | ............ | B01L 3/50825 73/863.21 |
| 6,615,667 B2 * | 9/2003 | Smith | ............ | A61B 5/0215 374/E1.008 |
| 6,901,808 B1 * | 6/2005 | Sharpless | ............ | G01L 9/0072 73/718 |
| 7,004,626 B1 * | 2/2006 | Giberson | ............ | G01K 7/02 136/230 |
| 7,204,150 B2 * | 4/2007 | Grudzien | ............ | G01L 19/0609 73/718 |
| 7,316,163 B2 * | 1/2008 | Grudzien | ............ | G01L 9/0075 361/283.4 |
| 7,443,169 B2 * | 10/2008 | Bjorkman | ............ | C23C 14/54 324/460 |
| 7,484,415 B2 * | 2/2009 | Kurtz | ............ | G01L 19/0609 73/716 |
| 7,641,388 B2 * | 1/2010 | Hayashi | ............ | G01K 1/18 374/148 |
| 7,690,262 B2 * | 4/2010 | Nakabayashi | ............ | G01K 1/18 73/708 |
| 7,762,140 B2 * | 7/2010 | Girroir | ............ | G01L 19/0092 361/283.4 |
| 7,765,874 B2 * | 8/2010 | Wuest | ............ | G01L 9/0075 73/715 |
| 7,946,178 B2 * | 5/2011 | Hanselmann | ............ | G01L 9/0075 73/706 |
| 8,087,825 B2 * | 1/2012 | Weiss | ............ | G01K 5/38 374/1 |
| 8,240,216 B2 * | 8/2012 | Kurtz | ............ | G01L 19/0609 73/703 |
| 8,417,084 B2 * | 4/2013 | Stoesz | ............ | G01K 11/3206 385/137 |
| 8,485,040 B2 * | 7/2013 | Petersen | ............ | G01L 19/0645 73/706 |
| 8,650,962 B2 * | 2/2014 | Angus | ............ | G01L 19/0609 73/700 |
| 8,820,168 B2 * | 9/2014 | Lux | ............ | G01L 19/0609 73/707 |
| 9,021,882 B2 * | 5/2015 | Schatz | ............ | G01K 11/22 73/594 |
| 9,080,927 B2 * | 7/2015 | Hurst | ............ | G01L 19/0609 |
| 9,476,294 B2 * | 10/2016 | Harman | ............ | E21B 47/06 |
| 9,528,898 B2 * | 12/2016 | Zinn | ............ | G01L 19/0681 |
| 9,572,949 B2 * | 2/2017 | Vos | ............ | G01K 7/24 |
| 9,658,125 B2 * | 5/2017 | Gilbert | ............ | G01L 19/10 |

FOREIGN PATENT DOCUMENTS

JP 5727117 B1 6/2015
WO 2015/105102 A1 7/2015

* cited by examiner

SENSOR DEVICE HAVING BODY, PRESSURE SENSOR, INSERT WITH HELICALLY SHAPED GROOVE AND TEMPERATURE SENSOR

CROSS-REFERENCE TO RELATED APPLICATION

This is a continuation of PCT International Application PCT/JP2015/077972 filed on Oct. 1, 2015, which claims priority to Japanese Patent Application No. 2014-204390 filed on Oct. 3, 2014. The disclosures of these applications including the specifications, the drawings, and the claims are hereby incorporated by reference in their entirety.

FIELD

The present application relates to a sensor device that detects pressure of high-temperature fluid.

BACKGROUND

As disclosed for example at Japanese Patent Publication No. 2012-121070, sensor devices that detect pressures of fluids (gases) handled by various factories, manufacturing devices, and so forth are known. Such a sensor device might have a measurement rod in which an air passage for flow thereinto of gas serving as detection target is formed, and a pressure sensor which is attached to said measurement rod and which detects the pressure of the gas that has flowed into the air passage. At such a sensor device, as a result of the fact that an end portion of the measurement rod is arranged at a location through which the gas flows, gas is able to flow into the air passage, and the pressure sensor is able to detect the pressure of that gas.

SUMMARY

It so happens that pressure sensors typically have temperatures at which they are designed to operate, and that a pressure sensor having a high operating temperature must be used when the fluid serving as detection target has a high temperature. For this reason, there has been the problem that the cost of the sensor device has been high.

One stratagem that may therefore be employed is to cause the passage (air passage) for the fluid to be formed as a helically shaped passage. A helically shaped passage permits increase in the area over which contact is made with the fluid in the body as compared, for example, with a straight passage. This makes it possible to promote heat transfer between the fluid and the body, so that even if the fluid has a high temperature in the vicinity of an entry port, it will be possible, at the fluid passage, to cause the fluid to have a lower temperature at a location in communication with the pressure sensor than it had at the entry port. However, formation of a helically shaped passage at the interior of the body causes fabrication cost to be greater than would be the case, for example, were a straight passage to be formed. This may cause increase in the cost of the sensor device.

The technology disclosed in the present application was conceived in light of such situation, it being an object thereof to provide a sensor device permitting inexpensive fabrication of a body at the interior of which a helically shaped passage is formed.

The technology disclosed in the present application is predicated upon a sensor device provided with a body of which formed at the interior is a fluid passage into which fluid serving as detection target flows; and a pressure sensor which is installed at the body so as to be in communication with the fluid passage and which detects fluid pressure within the fluid passage. In addition, the body has a cylindrical portion having a cylindrical inside circumferential surface. Moreover, the sensor device of the present application is provided with an insert that is formed in the shape of a rod at which a helically shaped groove is formed on an outside circumferential surface, and that is inserted into the cylindrical portion of the body such that the inside circumferential surface of said cylindrical portion and the helically shaped groove together form the fluid passage in such fashion that the fluid passage is helically shaped.

In accordance with the sensor device of the present application, a rod-shaped insert, at which a helically shaped groove (helical groove) is formed on an outside circumferential surface, is inserted into a cylindrical portion of a body such that an inside circumferential surface of the cylindrical portion and the helically shaped groove together form a helically shaped fluid passage. This makes it possible to fabricate a helically shaped passage more inexpensively than would be the case were, for example, a helically shaped passage to be fabricated by hollowing out the interior of the body. It is therefore possible to inexpensively fabricate a body at the interior of which a helically shaped passage is formed, and it is therefore possible to reduce cost of the sensor device.

DESCRIPTION OF EMBODIMENTS

Below, embodiments of the present application are described with reference to the drawings. Note that the following embodiments, being essentially preferred examples, are not intended to limit the technologies disclosed in the present application, the components suitable with respect thereto, and/or the scope of the fields of application thereof.

Embodiment 1

Embodiment 1 of the present application will be described with reference to FIG. 1 through FIG. 3. Sensor device 1 of the present embodiment, which might be attached to plumbing through which a fluid flows at a factory or the like, detects (measures) both the temperature and the pressure of the fluid. The present embodiment will be described in terms of an example in which steam is the fluid serving as detection target (measurement target). Moreover, the temperature of the steam that flows within the plumbing is approximately 500° C.

Figure 1:
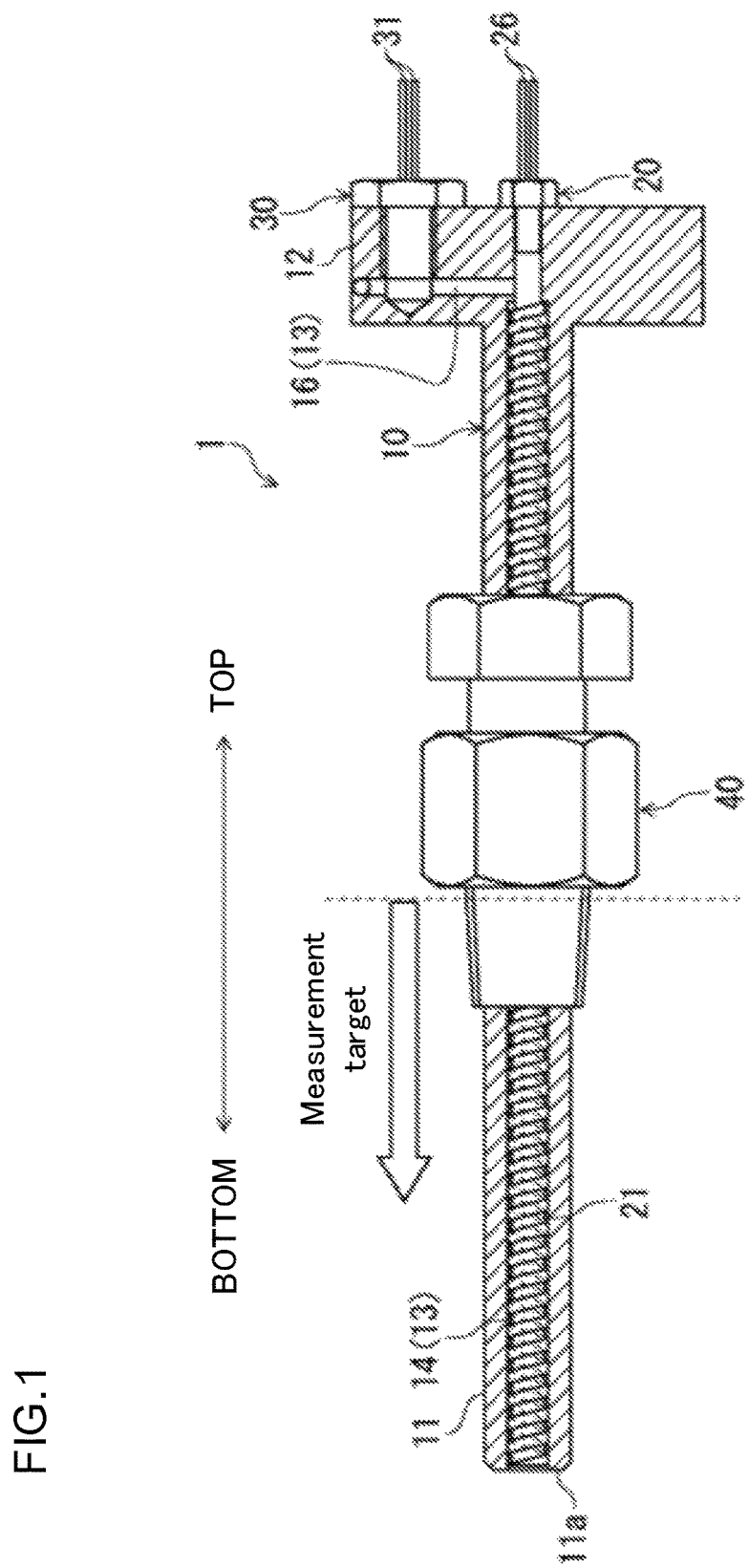
FIG. 1 is a sectional view showing schematic constitution of a sensor device associated with Embodiment 1.
Figure 2:
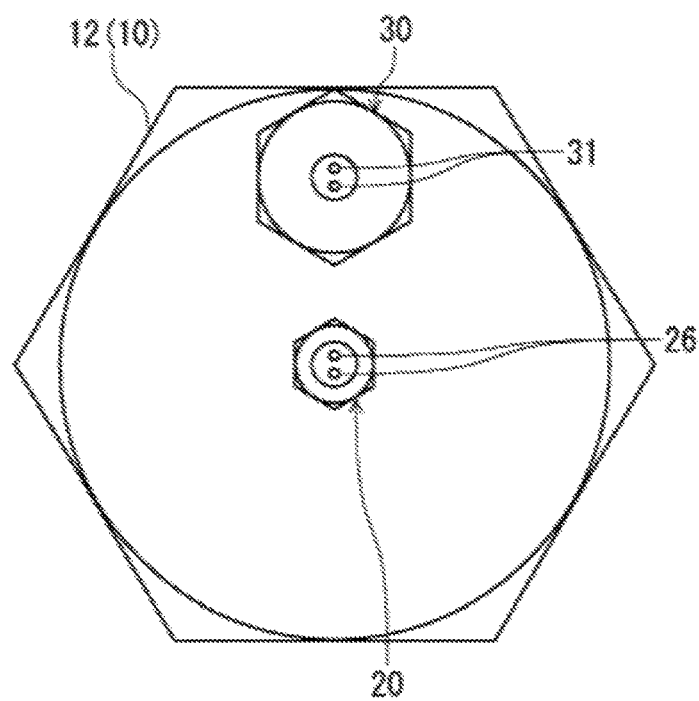
FIG. 2 is a drawing showing a sensor device associated with Embodiment 1 as seen from above.

As shown in FIG. 1 and FIG. 2, sensor device 1 is provided with body 10, temperature sensor 20 (thermocouple), pressure sensor 30, and attachment member 40.

Formed at the interior of body 10 is gas passage 13 into which steam serving as detection target flows. This gas passage 13 constitutes the fluid passage that is associated with the claims of the present application. More specifically, body 10 has rod-shaped portion 11 and head portion 12. Rod-shaped portion 11, which is formed so as to be in the shape of a cylinder extending in a vertical direction (the direction indicated by the arrow at FIG. 1), constitutes the cylindrical portion that is associated with the claims of the present application. Rod-shaped portion 11 is such that one end (the bottom end) constitutes the steam entry end, and such that head portion 12 is formed in integral fashion at the other end (the top end). Head portion 12 is formed so as to be hexagonal as viewed from above. Gas passage 13 has helical passage 14 (helically shaped passage) formed in rod-shaped portion 11 and lateral passage 16 formed in head portion 12. Helical passage 14 is such that entry port 14a which constitutes one end thereof is open at bottom end face 11a of rod-shaped portion 11 (see FIG. 3), and is such that the other end thereof is in communication with lateral passage 16. In other words, entry port 14a of helical passage 14, which is also the entry port of gas passage 13, is open at an end face in the axial direction of rod-shaped portion 11. In addition, at rod-shaped portion 11, helical passage 14 is formed so as to extend in the axial direction (vertical direction).

Head portion 12 is provided with temperature sensor 20 and pressure sensor 30. Temperature sensor 20 has sheath pipe 21, incorporated within which there is a thermocouple or resistance temperature detector that detects the temperature of the steam. Sheath pipe 21 is inserted within rod-shaped portion 11 of body 10. Pressure sensor 30, which is installed at head portion 12 in such fashion as to be in communication with lateral passage 16 of gas passage 13, detects the pressure of the steam within lateral passage 16 (i.e., within gas passage 13). In other words, at gas passage 13, helical passage 14 is formed from entry port 14a to a location in communication with pressure sensor 30. At temperature sensor 20 and pressure sensor 30, signals associated with the temperature and the pressure respectively detected thereby are sent to external equipment by way of wires 26, 31.

Rod-shaped portion 11 of body 10 is provided with attachment member 40 for attaching sensor device 1 to plumbing. Sensor device 1 is secured to plumbing by attachment member 40 in such fashion as to cause the bottom end (measurement target end shown in FIG. 1) of rod-shaped portion 11 to be inserted within the plumbing. At this time, sensor device 1 is secured in such fashion that rod-shaped portion 11 extends in a vertical direction. Note that attachment member 40 is constituted so as to permit adjustment of the length of rod-shaped portion 11 that is inserted within the plumbing. At sensor device 1 which has been secured thereto in this manner, the bottom end of rod-shaped portion 11 is in a state such that it is exposed to the steam within the plumbing, steam within the plumbing entering helical passage 14 and flowing to lateral passage 16.

Next, helical passage 14 of gas passage 13 will be described in further detail. Inside circumferential surface 11b of rod-shaped portion 11 is formed so as to be cylindrical in shape. Sheath pipe 21 of temperature sensor 20 is inserted within rod-shaped portion 11. As also shown in FIG. 3, sheath pipe 21 is formed so as to be in the shape of a long slender rod (more specifically, so as to be cylindrically shaped), helical groove 23 (helically shaped groove) being formed on outside circumferential surface 22 thereof. Helical groove 23 extends in the axial direction (vertical direction) at outside circumferential surface 22 of sheath pipe 21. Helical groove 23 is formed along a region corresponding to the full length of rod-shaped portion 11 at sheath pipe 21. Furthermore, helical groove 23 is formed so as to be arcuate in shape as viewed in horizontal cross-section. Note that "as viewed in horizontal cross-section" means a section of helical groove 23 taken along a plane perpendicular to the axial direction (length direction) thereof.

The outside diameter of sheath pipe 21 which is inserted within rod-shaped portion 11 is roughly the same as the inside diameter of rod-shaped portion 11. In other words, sheath pipe 21 is inserted within rod-shaped portion 11 in such fashion that outside circumferential surface 22 is in contact with inside circumferential surface 11b of rod-shaped portion 11. In addition, at rod-shaped portion 11, the inside circumferential surface 11b thereof and the helical groove 23 of sheath pipe 21 together form the aforementioned helical passage 14. In other words, sheath pipe 21 of temperature sensor 20 constitutes an insert which, when inserted within rod-shaped portion 11, forms helical passage 14 between it and inside circumferential surface 11b of rod-shaped portion 11.

Figure 3:
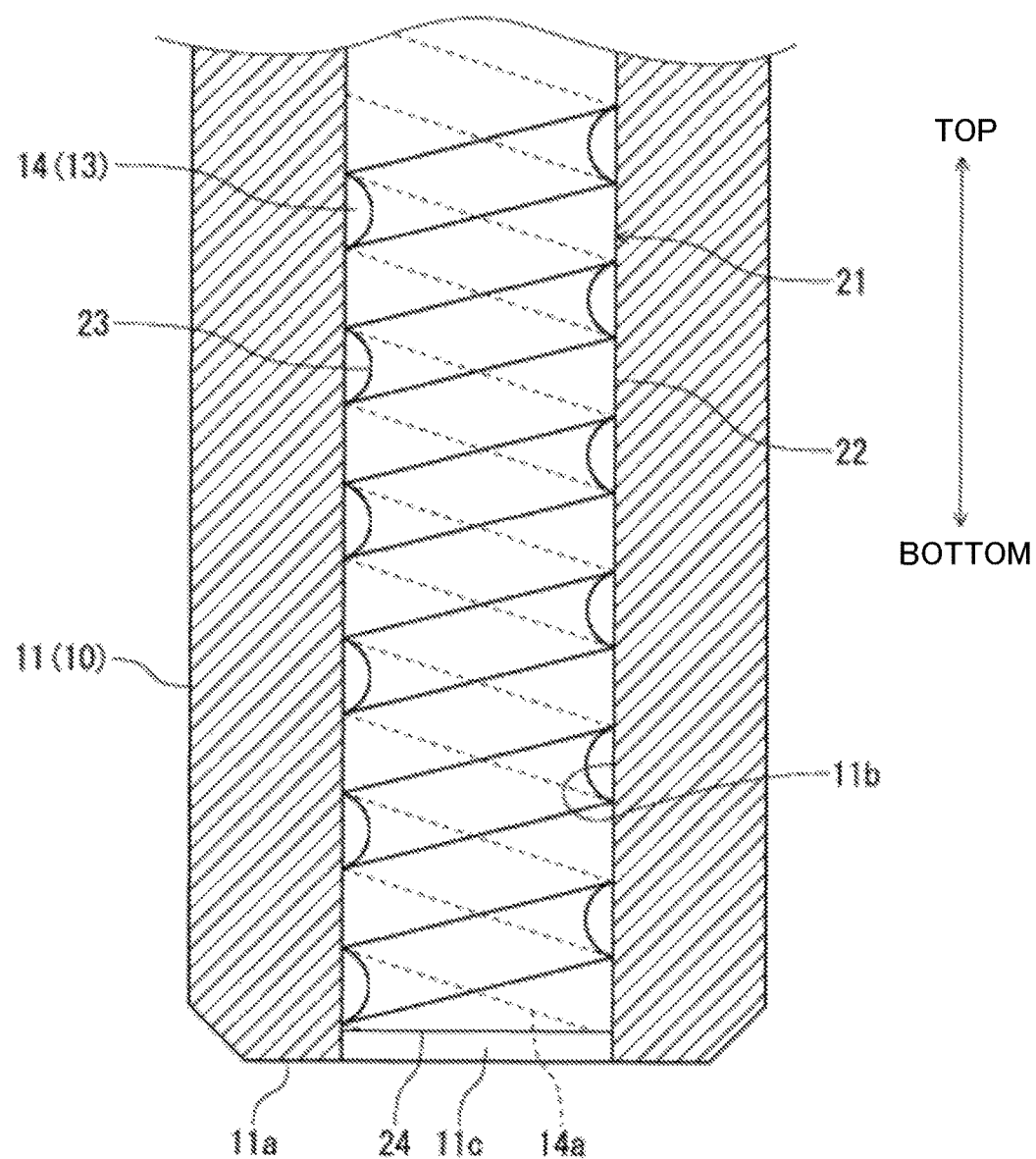
FIG. 3 is a sectional view showing principal parts of a sensor device associated with Embodiment 1.

Furthermore, as shown in FIG. 3, at rod-shaped portion 11, bottom end face 24 of sheath pipe 21 is located at a position which is inward from bottom end face 11a of rod-shaped portion 11. In other words, to the extent to which bottom end face 24 of sheath pipe 21 is located at a position that is inward therefrom, space 11c is formed at the bottom end of rod-shaped portion 11, entry port 14a of helical passage 14 being in communication with this space 11c. Providing such a space 11c makes it possible to cause steam flowing within plumbing to more easily flow into helical passage 14 (gas passage 13) of rod-shaped portion 11.

As described above, sensor device 1 of the foregoing embodiment is such that a rod-shaped insert (sheath pipe 21) at which a helical groove 23 (helically shaped groove) is formed on outside circumferential surface 22 is inserted into rod-shaped portion 11 of body 10 such that inside circumferential surface 11b of rod-shaped portion 11 and helical groove 23 together form helical passage 14 (helically shaped passage). This makes it possible to fabricate helical passage 14 more inexpensively and more easily than would be the case were it, for example, fabricated by hollowing out of the interior of the body. Body 10, at the interior of which helical passage 14 is formed, can therefore be fabricated inexpensively, and reduction in the cost of sensor device 1 will be possible.

Furthermore, formation of helical passage 14 at gas passage 13 makes it possible to increase the area over which is contact is made with steam at rod-shaped portion 11 as compared, for example, with a straight passage. This being the case, it will be possible to promote heat transfer between the steam and rod-shaped portion 11 (body 10). Accordingly, at gas passage 13, even if the steam has high temperature in the vicinity of entry port 14a, it will be possible to cause it to have low temperature in the vicinity of pressure sensor 30. In other words, at gas passage 13, inasmuch as the temperature of the steam gradually decreases due to exchange of heat with body 10, increase in contact area between the steam and body 10 permits increase in the amount by which the temperature of the steam is reduced. This being the case, notwithstanding that the detection target is high-temperature steam (fluid), because it is possible to employ a pressure sensor 30 designed to operate at a temperature lower than that temperature, the need to employ a pressure sensor capable of withstanding high temperatures is eliminated, permitting reduction in the cost of sensor device 1.

Furthermore, because sensor device 1 of the foregoing embodiment is provided not only with pressure sensor 30 but also with temperature sensor 20, it is possible with a single sensor device 1 to detect (measure) both the pressure and the temperature of the steam. Moreover, because sheath pipe 21 of temperature sensor 20 is employed as an insert that is inserted into rod-shaped portion 11, the need to separately provide an insert is eliminated, permitting reduction in parts count and making it possible to achieve a more compact design.

Furthermore, because helical groove 23 formed at outside circumferential surface 22 of the insert (sheath pipe 21) is arcuate in shape as viewed in horizontal cross-section, it is possible to reduce resistance to flow of the steam (fluid) as compared, for example, with the situation that would exist were this rectangular or otherwise angular as viewed in horizontal cross-section. It will therefore be possible to more accurately detect the pressure of the steam.

Embodiment 2

Embodiment 2 of the present application will be described with reference to FIG. 4 and FIG. 5. The present embodiment employs a variation on the constitution (shape) of helical passage 14 at the foregoing Embodiment 1. Here, mention will be made of those points that are different from the foregoing Embodiment 1.

Figure 4:
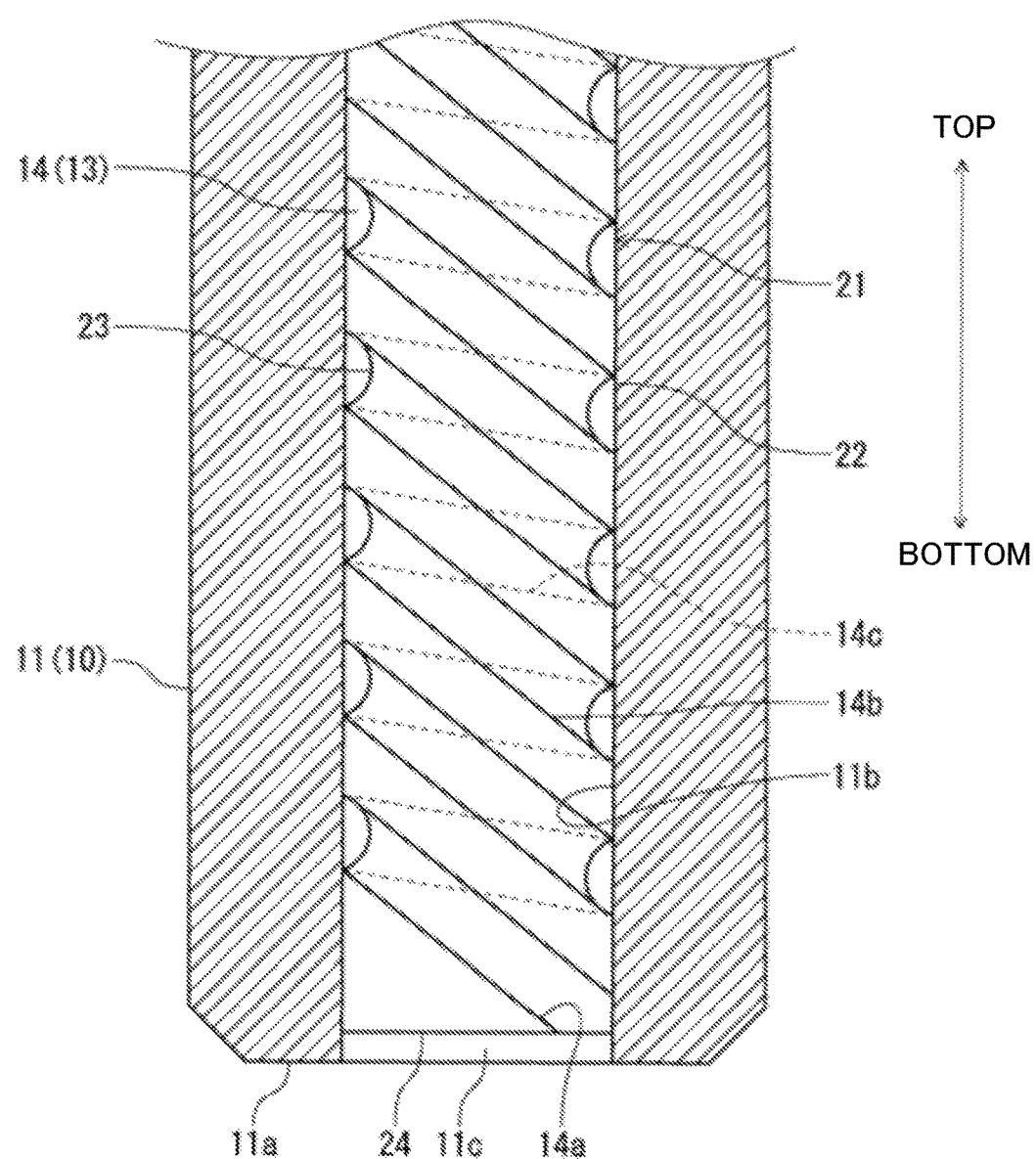
FIG. 4 is a sectional view showing principal parts of a sensor device associated with Embodiment 2.

As shown in FIG. 4, helical passage 14 of the present embodiment is such that formed therein are descending portions 14c which are downwardly inclined at locations intermediate therealong. More specifically, helical groove 23 formed at outside circumferential surface 22 of sheath pipe 21 is such that ascending portions 14b which are upwardly inclined as one proceeds toward a location in communication with pressure sensor 30 (i.e., lateral passage 16), and descending portions 14c (portions shown in broken line at FIG. 3) which are downwardly inclined as one proceeds toward a location in communication with pressure sensor 30, are present therealong in alternating fashion. The constitution of this helical groove 23 causes helical passage 14 to be such that ascending portions 14b and descending portion 14c are formed in alternating fashion in the vertical direction.

Figure 5:
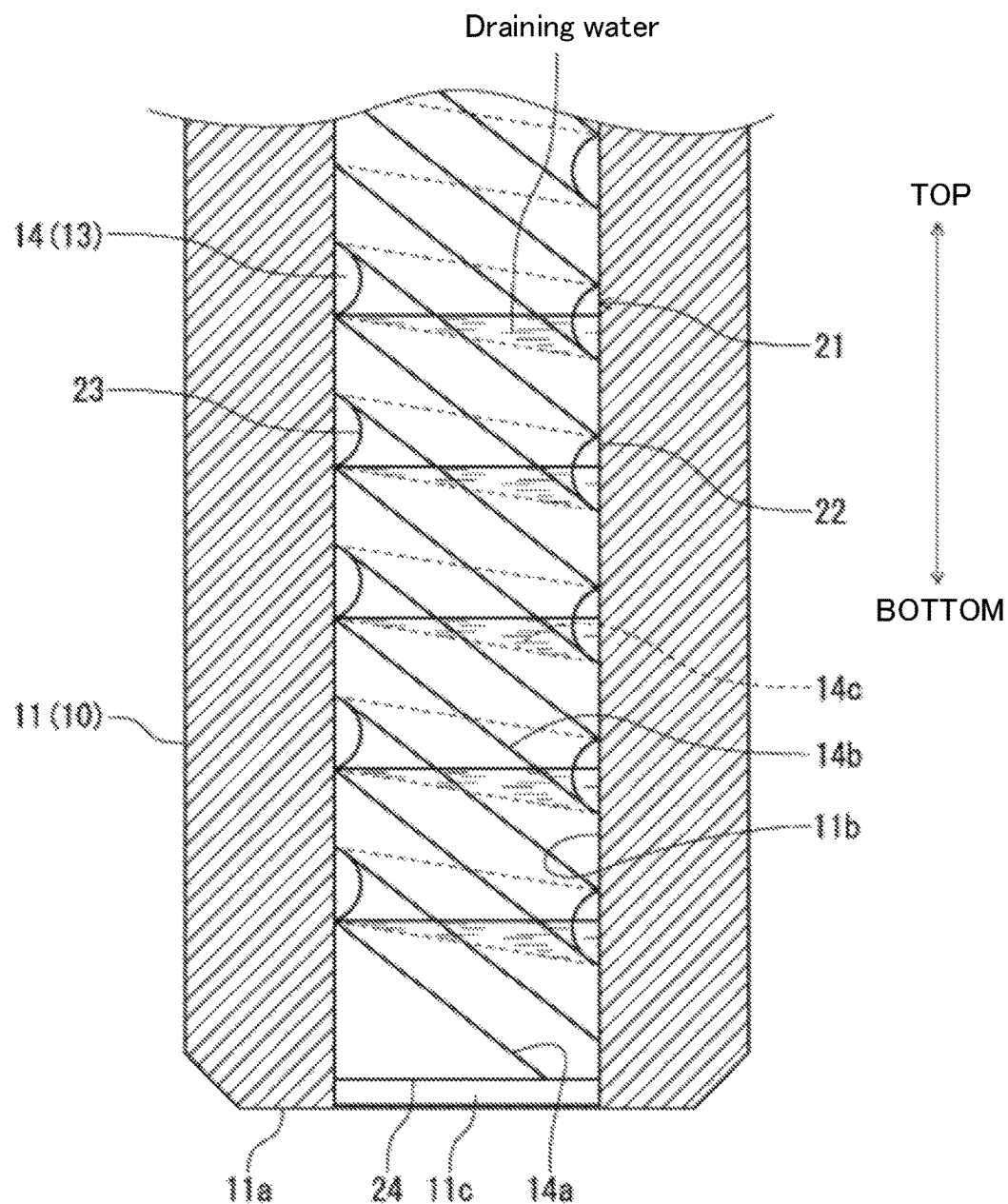
FIG. 5 is a sectional view showing principal parts of a sensor device associated with Embodiment 2.

As shown in FIG. 5, sensor device 1 of the present embodiment makes it possible for draining water produced by condensation of steam within helical passage 14 and/or within lateral passage 16 to collect in a continuous region from descending portion 14c to ascending portion 14b. Whereas exchange of heat with body 10 by the steam at helical passage 14 may cause this to condense and become draining water, it is possible to cause this draining water to pool at locations intermediate along helical passage 14. By thus causing draining water which is liquid to be present at intervening locations along helical passage 14, it is possible to inhibit high temperature in the vicinity of entry port 14a from being transferred to pressure sensor 30 by way of gas passage 13. In other words, inasmuch as the heat transfer coefficient of liquid (draining water) is typically lower than that of gas (steam), by causing liquid to be present in intervening fashion at a portion of gas passage 13 it is possible to impede the transfer of heat at gas passage 13. This also makes it possible to employ a pressure sensor 30 designed to operate at low temperature, as a result of which still further reduction in the cost of sensor device 1 is permitted. The constitution, operation, and benefits thereof are in other respects similar to those of the foregoing Embodiment 1.

Note that whereas there were a plurality of descending portions 14c at helical passage 14 of the present embodiment, the technology disclosed in the present application is not limited thereto, it being possible for only one descending portion 14c to be provided thereat.

Embodiment 3

Embodiment 3 of the present application will be described with reference to FIG. 6 and FIG. 7. Sensor device 1 of the present embodiment is a variation on the manner of formation of the helical passage of the foregoing Embodiment 1. Here, mention will be made of those points that are different from the foregoing Embodiment 1.

Figure 6:
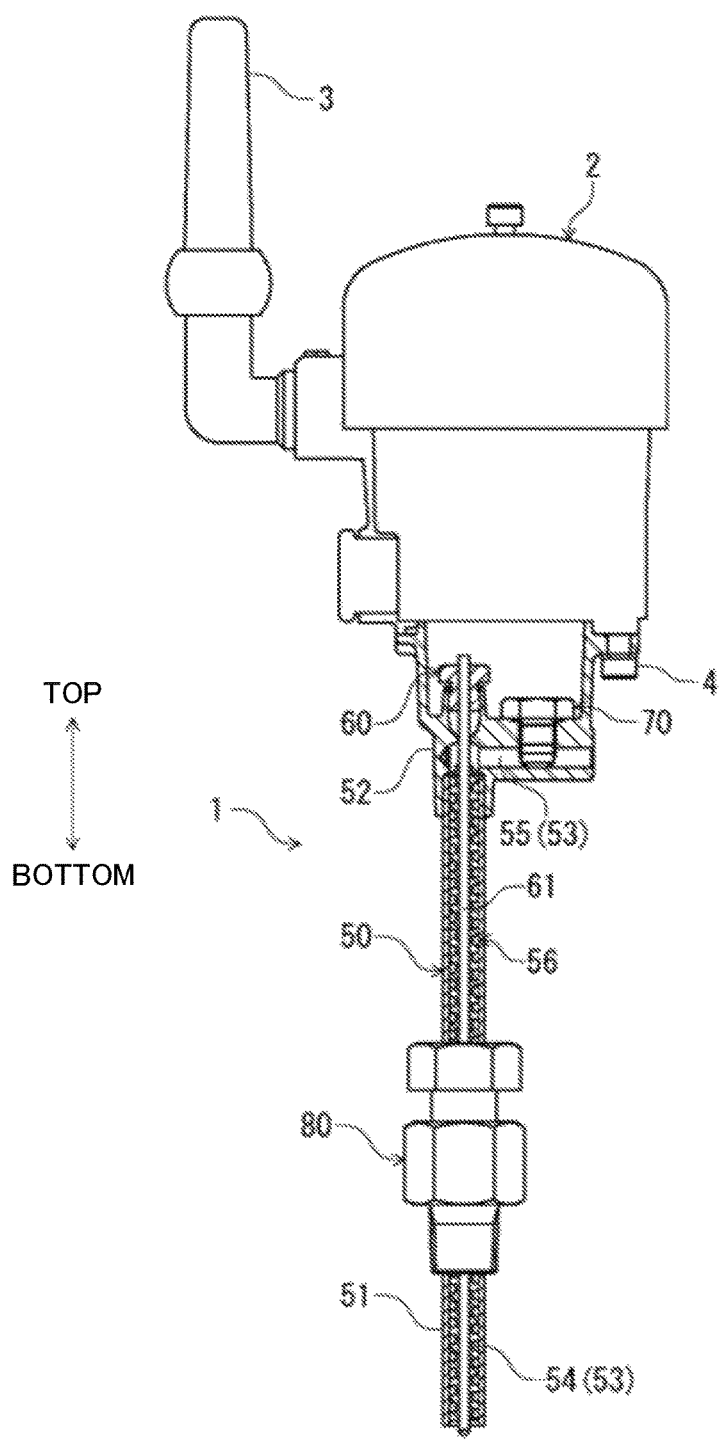
FIG. 6 is a sectional view showing schematic constitution of a sensor device associated with Embodiment 3.

As shown in FIG. 6, sensor device 1 of the present embodiment is such that wireless communication device 2 having communication antenna 3 is attached thereto. Sensor device 1 is provided with body 50, insert 56, temperature sensor 60 (thermocouple), pressure sensor 70, and attachment member 80.

Figure 7:
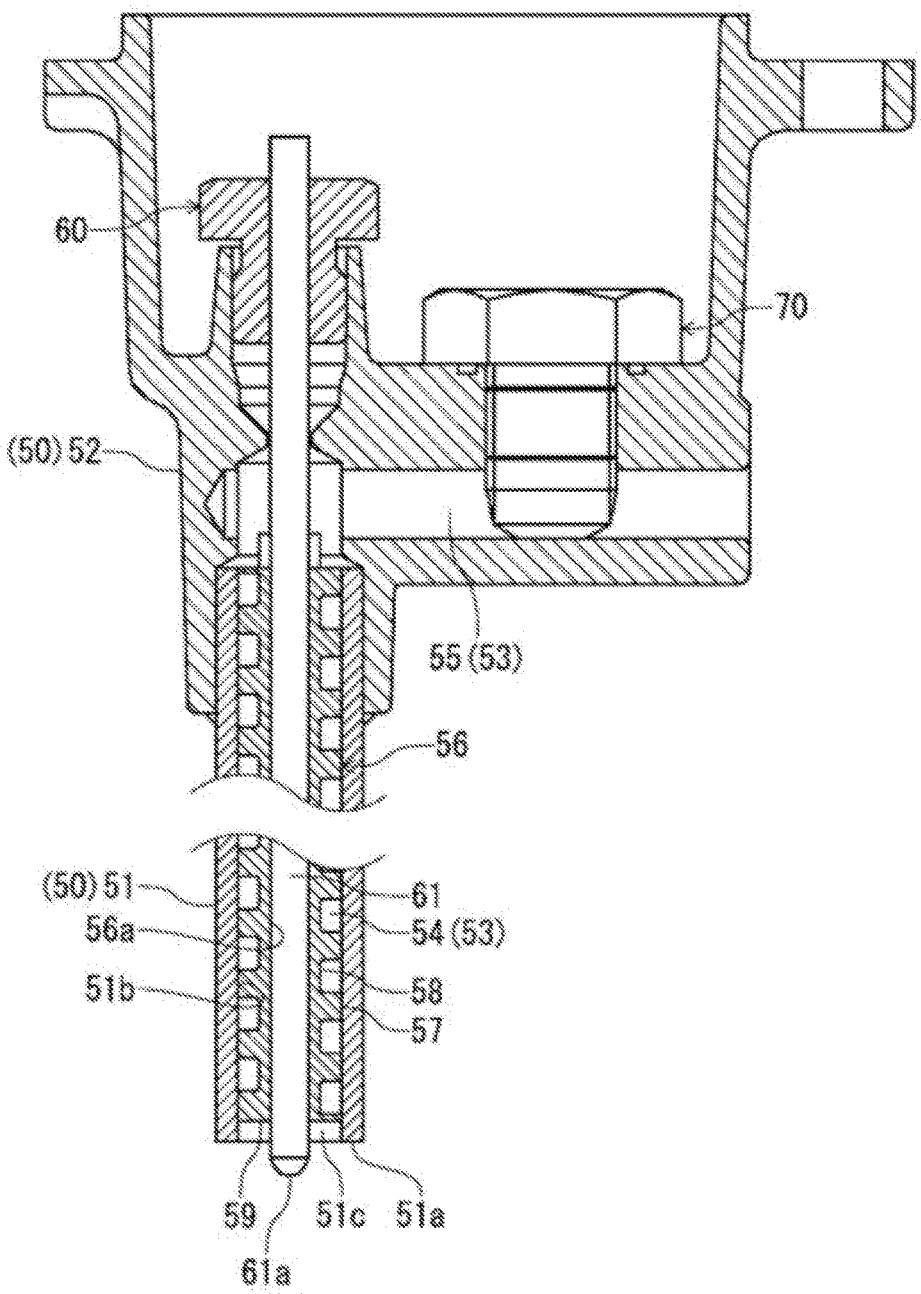
FIG. 7 is a sectional view showing principal parts of a sensor device associated with Embodiment 3.

As can be seen at FIG. 7, similar to the situation that existed at the foregoing Embodiment 1, formed at the interior of body 50 is gas passage 53 into which steam serving as detection target flows. More specifically, body 50 has rod-shaped portion 51 and head portion 52. Rod-shaped portion 51, which is formed so as to be in the shape of a cylinder extending in a vertical direction (the direction indicated by the arrow at FIG. 6), constitutes the cylindrical portion that is associated with the claims of the present application. Rod-shaped portion 51 is such that one end (the bottom end) constitutes the steam entry end, and such that head portion 52 is fitted within and connected to the other end (the top end). Head portion 52 is formed so as to be more or less L-shaped as viewed from the front. Gas passage 53 has helical passage 54 (helically shaped passage) at rod-shaped portion 51 and lateral passage 55 at head portion 52. Helical passage 54 is such that an entry port (not shown) which constitutes one end thereof is open at bottom end face 51a of rod-shaped portion 51, and is such that the other end thereof is in communication with lateral passage 55. In other words, the entry port of helical passage 54, which is also the entry port of gas passage 53, is open at an end face in the axial direction of rod-shaped portion 51. In addition, at rod-shaped portion 51, helical passage 54 is formed so as to extend in the axial direction (vertical direction).

Inside circumferential surface 51b of rod-shaped portion 51 is formed so as be cylindrical in shape, and rod-shaped (more specifically, cylindrically shaped) insert 56 is inserted within that rod-shaped portion 51. Insert 56 is such that helical groove 58 (helically shaped groove) is formed on outside circumferential surface 57 thereof. Helical groove 58 extends in the axial direction (vertical direction) at outside circumferential surface 57 of insert 56, being formed along a region corresponding to the full length of rod-shaped portion 51. Note that helical groove 58 of the present embodiment is formed so as to be rectangular in shape as viewed in horizontal cross-section. The outside diameter of insert 56 is roughly the same as the inside diameter of rod-shaped portion 51. In other words, insert 56 is inserted within rod-shaped portion 51 in such fashion that outside circumferential surface 57 is in contact with inside circumferential surface 51b of rod-shaped portion 51. In addition, at rod-shaped portion 51, the inside circumferential surface 51b thereof and the helical groove 58 of insert 56 together form the aforementioned helical passage 54. In other words, at sensor device 1 of the present embodiment, insert 56, when inserted within rod-shaped portion 51 of body 50, forms helical passage 54 between it and inside circumferential surface 51b of rod-shaped portion 51.

Head portion 52, as was the case at the foregoing Embodiment 1, is provided with temperature sensor 60 and pressure sensor 70. Sheath pipe 61 at temperature sensor 60, which is formed in the shape of a long slender cylinder, is inserted within through-hole 56a formed in insert 56. Note that sheath pipe 61 is engaged in clearance fit fashion with through-hole 56a of insert 56. Furthermore, sheath pipe 61 is provided in such fashion that tip 61a protrudes from bottom end face 51a of rod-shaped portion 51. Pressure sensor 70, as was the case at the foregoing Embodiment 1, is provided at head portion 52 in such fashion as to be in communication with lateral passage 55, and detects the pressure of the steam within lateral passage 55. Sensor device 1 of the present embodiment is such that head portion 52 is fastened and secured below communication device 2 by means of bolts 4. At sensor device 1, signals associated with the temperature and the pressure detected by temperature sensor 60 and pressure sensor 70 are sent to communication device 2 by way of wires (not shown). At communication device 2, signals sent thereto from temperature sensor 60 and so forth are processed before being sent to external equipment by way of antenna 3. Moreover, rod-shaped portion 51 of body 50 is provided with attachment member 80 in similar fashion as was the case at the foregoing Embodiment 1.

Furthermore, at rod-shaped portion 51, bottom end face 59 of insert 56 is located at a position which is inward from bottom end face 51a of rod-shaped portion 51. In other words, to the extent to which bottom end face 59 of insert 56 is located at a position that is inward therefrom, space 51c is formed at the bottom end of rod-shaped portion 51, the entry port (not shown) of helical passage 54 being in communication with this space 51c. Providing such a space 51c makes it possible, as was the case at the foregoing Embodiment 1, to cause steam flowing within plumbing to more easily flow into helical passage 54 (gas passage 53) of rod-shaped portion 51.

As described above, because sensor device 1 of the present embodiment is also formed such that a rod-shaped insert 56 at which a helical groove 58 (helically shaped groove) is formed on outside circumferential surface 57 is inserted into rod-shaped portion 51 of body 50 such that inside circumferential surface 51b of rod-shaped portion 51 and helical groove 58 together form helical passage 54 (helically shaped passage), it exhibits similar operation and benefits as at the foregoing Embodiment 1. The constitution, operation, and benefits thereof are in other respects similar to those of the foregoing Embodiment 1.

At sensor device 1 of the present embodiment as well, note that that helical passage 54 may be such that ascending portion(s) and descending portion(s) are formed at location(s) intermediate therealong in similar fashion as at the foregoing Embodiment 2.

Moreover, at each of the foregoing embodiments, the technology disclosed in the present application may be constituted as follows.

For example, the shape as viewed in horizontal cross-section of helical groove 23 formed at the insert of the foregoing Embodiment 1 and/or Embodiment 2 instead of being arcuate might be rectangular or might be otherwise angular, and the shape as viewed in horizontal cross-section of helical groove 58 formed at insert 56 of the foregoing Embodiment 3 might be arcuate.

Furthermore, temperature sensor 20 of the foregoing Embodiment 1 and/or Embodiment 2 may be omitted. In such case, as indicated at the foregoing Embodiment 3, the fact that a rod-shaped insert at which a helical groove is formed on the outside circumferential surface thereof is inserted into a rod-shaped portion 11 will cause a helical passage to be formed at the interior of the body 10. Furthermore, it is also possible to omit temperature sensor 60 of the foregoing Embodiment 3.

Furthermore, whereas sensor device 1 of the foregoing Embodiments 1 and 3 was described in terms of an example in which steam served as detection target, the detection target associated with the technology disclosed in the present application may be a gas other than steam or may be a liquid. Furthermore, at sensor device 1 of the foregoing Embodiment 2, the detection target may be a gas other than steam.

INDUSTRIAL APPLICABILITY

The technology disclosed in the present application is effective in the context of a sensor device provided with a pressure sensor that detects the pressure of a fluid.

DESCRIPTION OF REFERENCE CHARACTERS

1 Sensor device
10, 50 Body
11, 51 Rod-shaped portion (cylindrical portion)
11b, 51b Inside circumferential surface
13, 53 Gas passage (fluid passage)
14, 54 Helical passage (helically shaped passage)
14c Descending portion
20, 60 Temperature sensor
21 Sheath pipe (insert)
22 Outside circumferential surface
23 Helical groove (helically shaped groove)
30, 70 Pressure sensor
56 Insert
57 Outside circumferential surface
58 Helical groove (helically shaped groove)

The invention claimed is:
1. A sensor device comprising:
a body, the body comprising an interior, the interior comprising a fluid passage, wherein fluid serving as a detection target flows into the fluid passage,
wherein the body further comprises a cylindrical portion, a head portion, and a lateral passage extending laterally from the fluid passage; and
a pressure sensor installed at the body in communication with the lateral passage, wherein the pressure sensor detects fluid pressure inside the lateral passage;
wherein the cylindrical portion has a cylindrical inside circumferential surface,
wherein the body comprises an insert,
wherein the insert is formed in a shape of a rod,
wherein the insert comprises an outside circumferential surface,
wherein a helically shaped groove is formed on the outside circumferential surface of the insert,
wherein the insert is positioned in the cylindrical portion of the body,
wherein the inside circumferential surface of the cylindrical portion and the helically shaped groove together form the fluid passage, wherein the fluid passage is helically shaped, and
wherein the outside circumferential surface of the insert is in contact with the inside circumferential surface of the cylindrical portion; and
a temperature sensor having a cylindrical sheath pipe,
wherein a thermocouple or resistance temperature detector that detects temperature of the fluid is incorporated within the cylindrical sheath pipe of the temperature sensor,
wherein the cylindrical sheath pipe is positioned in the insert with a tip of the cylindrical sheath pipe protruding from the insert,
wherein the temperature sensor detects temperature inside the cylindrical sheath pipe,
wherein the pressure sensor is positioned a spaced distance apart from the temperature sensor,
wherein the pressure sensor and the temperature sensor are positioned in the head portion and
wherein the temperature sensor extends into the insert.

2. The sensor device according to claim 1, wherein the helically shaped groove of the insert
   extends in a vertical direction and
   has a descending portion that is downwardly inclined as one proceeds toward a location in communication with the pressure sensor.

3. The sensor device according to claim 1, wherein the helically shaped groove of the insert is formed so as to be arcuate in shape as viewed in horizontal cross-section.

4. A sensor device comprising:
a body, the body comprising an interior, the interior comprising a fluid passage, wherein fluid serving as a detection target flows into the fluid passage,
wherein the body further comprises a cylindrical portion, a head portion, and a lateral passage extending laterally from the fluid passage; and
a pressure sensor installed at the body in communication with the lateral passage, wherein the pressure sensor detects fluid pressure inside the lateral passage;
wherein the cylindrical portion has a cylindrical inside circumferential surface,
wherein the body comprises an insert,
wherein the insert is formed in a shape of a rod,
wherein the insert comprises an outside circumferential surface,
wherein a helically shaped groove is formed on the outside circumferential surface-of the insert,
wherein the insert is positioned in the cylindrical portion of the body,
wherein the inside circumferential surface of the cylindrical portion and the helically shaped groove together form the fluid passage, and
wherein the fluid passage is helically shaped; and
a temperature sensor having a cylindrical sheath pipe,
wherein a thermocouple or resistance temperature detector that detects temperature of the fluid is incorporated within the cylindrical sheath pipe of the temperature sensor,
wherein the cylindrical sheath pipe is positioned in the insert with a tip of the cylindrical sheath pipe protruding from the insert, and
wherein the temperature sensor detects temperature inside the cylindrical sheath pipe,
wherein the pressure sensor is positioned a spaced distance apart from the temperature sensor,
the pressure sensor and the temperature sensor are positioned in the head portion, and
the temperature sensor extends into the insert.

* * * * *